United States Patent
Jia et al.

(10) Patent No.: US 10,735,143 B2
(45) Date of Patent: Aug. 4, 2020

(54) SYSTEM AND METHOD FOR BIT MAPPING IN MULTIPLE ACCESS

(71) Applicants: Ming Jia, Ottawa (CA); Jianglei Ma, Ottawa (CA); Sanjeewa Herath, Ottawa (CA); Alireza Bayesteh, Ottawa (CA)

(72) Inventors: Ming Jia, Ottawa (CA); Jianglei Ma, Ottawa (CA); Sanjeewa Herath, Ottawa (CA); Alireza Bayesteh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 108 days.

(21) Appl. No.: 15/869,156

(22) Filed: Jan. 12, 2018

(65) Prior Publication Data

US 2019/0140779 A1    May 9, 2019

Related U.S. Application Data

(60) Provisional application No. 62/582,370, filed on Nov. 7, 2017.

(51) Int. Cl.
*H04L 1/16* (2006.01)
*H04L 5/00* (2006.01)
(Continued)

(52) U.S. Cl.
CPC ............ *H04L 1/1614* (2013.01); *H04B 1/69* (2013.01); *H04B 7/04* (2013.01); *H04B 7/0413* (2013.01);
(Continued)

(58) Field of Classification Search
None
See application file for complete search history.

(56) References Cited

U.S. PATENT DOCUMENTS 9,667,459 B1 * 5/2017 Naim ................... H04L 27/2602
2009/0291700 A1 * 11/2009 Callard ............... H04W 72/085
455/503

(Continued)

FOREIGN PATENT DOCUMENTS

| CN | 103843275 A | 6/2014 |
|---|---|---|
| WO | 2016023517 A1 | 2/2016 |
| WO | 2017071586 A1 | 5/2017 |

OTHER PUBLICATIONS

S. Zhang, X. Xu, L. Lu, Y. Wu, G. He and Y. Chen, "Sparse code multiple access: An energy efficient uplink approach for 5G wireless systems," 2014 IEEE Global Communications Conference, Austin, TX, 2014, pp. 4782-4787.*

(Continued)

*Primary Examiner* — Ayaz R Sheikh
*Assistant Examiner* — Tarell A Hampton

(57) ABSTRACT

Methods of transmitting and receiving a set of bits are provided. In the transmitting method, some of the bits are mapped to modulated symbol, and some of the bits map to a subset of transmission resources out of a first set of transmission resources. The modulated symbol is transmitted using the subset of transmission resources. At the receiver, a modulated symbol is received using a subset of transmission resources. Some bits are recovered by demodulating the demodulated symbol, and some of the bits are recovered based on the subset of transmission resources over which the modulated symbol was received.

13 Claims, 10 Drawing Sheets

(51) Int. Cl.
  *H04L 27/00* (2006.01)
  *H04B 7/06* (2006.01)
  *H04J 13/00* (2011.01)
  *H04B 7/04* (2017.01)
  *H04B 1/69* (2011.01)
  *H04B 7/0413* (2017.01)
  *H04L 1/00* (2006.01)

(52) U.S. Cl.
  CPC ............ *H04B 7/0695* (2013.01); *H04J 13/00* (2013.01); *H04L 5/0007* (2013.01); *H04L 27/0008* (2013.01); *H04L 1/0068* (2013.01); *H04L 1/0071* (2013.01)

(56) References Cited

U.S. PATENT DOCUMENTS

| | | | | |
|---|---|---|---|---|
| 2011/0158348 | A1* | 6/2011 | Ponnampalam | H04L 27/2627 375/298 |
| 2016/0049999 | A1* | 2/2016 | Taherzadeh Boroujeni | H04J 13/16 370/335 |
| 2016/0050039 | A1* | 2/2016 | Ma | H04L 5/0016 370/329 |
| 2016/0072660 | A1 | 3/2016 | Nikopour et al. | |
| 2016/0254937 | A1* | 9/2016 | Bayesteh | H04L 1/0054 375/341 |
| 2017/0295500 | A1* | 10/2017 | Sun | H04B 7/0456 |
| 2017/0338869 | A1* | 11/2017 | Wu | H04L 1/06 |
| 2017/0338922 | A1* | 11/2017 | Bakulin | H04B 1/69 |
| 2017/0353959 | A1* | 12/2017 | Xu | H04W 72/12 |
| 2018/0077685 | A1* | 3/2018 | Wu | H04L 5/0046 |
| 2018/0091980 | A1* | 3/2018 | Sun | H04W 16/14 |

OTHER PUBLICATIONS

H. Nikopour and H. Baligh, "Sparse code multiple access," 2013 IEEE 24th Annual International Symposium on Personal, Indoor, and Mobile Radio Communications (PIMRC), London, 2013, pp. 332-336. doi: 10.1109/PIMRC.2013.6666156.*

* cited by examiner

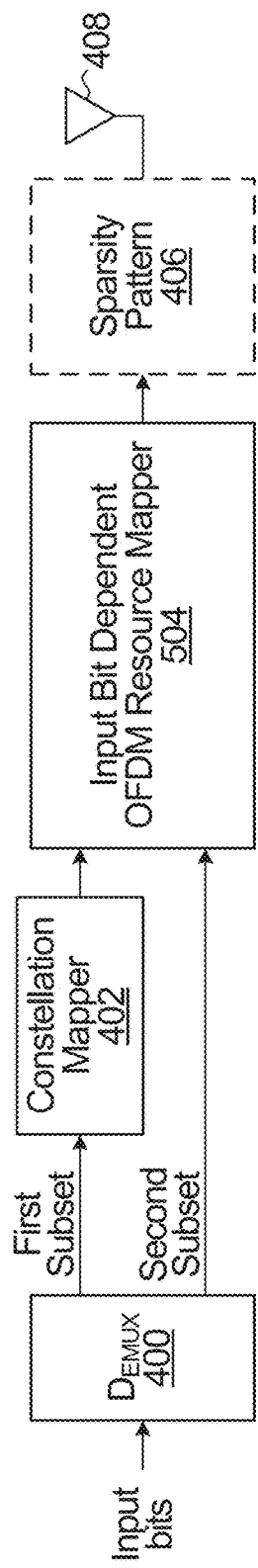
FIG. 5A
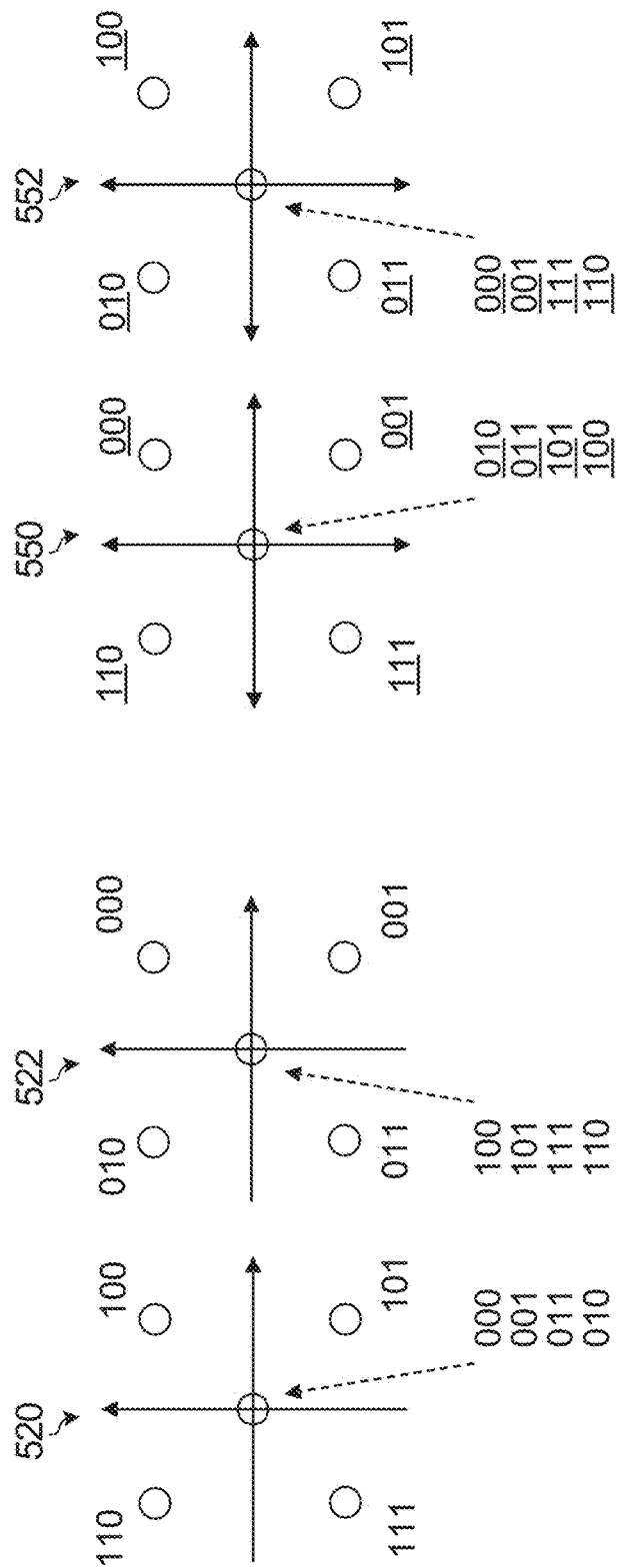
FIG. 5B
FIG. 5C

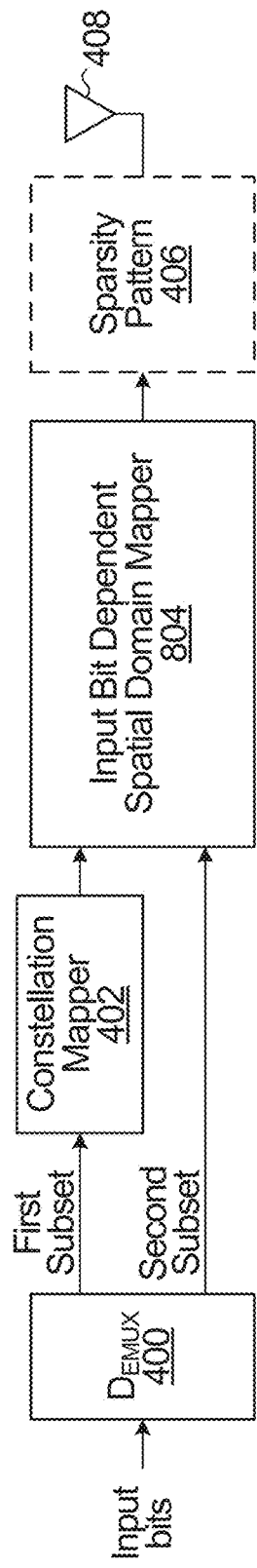
FIG. 8A
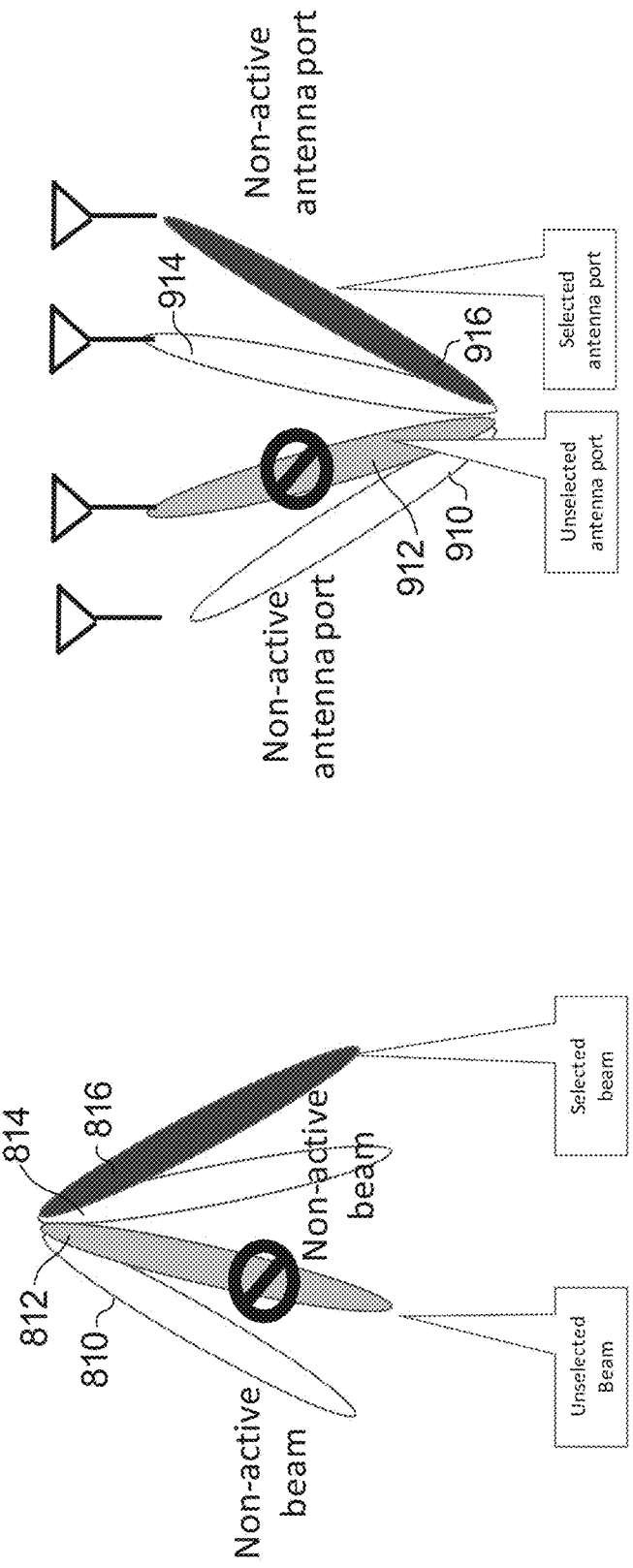
FIG. 8B
FIG. 8C

SYSTEM AND METHOD FOR BIT MAPPING IN MULTIPLE ACCESS

CROSS REFERENCE

This application claims the benefit of U.S. Provisional Application No. 62/582,370 entitled "SYSTEM AND METHOD FOR BIT MAPPING IN MULTIPLE ACCESS" filed Nov. 7, 2017 and is hereby incorporated by reference in its entirety.

FIELD

The present disclosure relates generally to digital communications, and more particularly to a system and method for bit mapping.

BACKGROUND

Sparse-code multiple access (SCMA) is a non-orthogonal multiple access scheme that allows multiple devices, users, or user equipments (UEs) to share channel resources in the code domain. Potential transmit devices are allocated time and frequency resources, also referred to as resource units.

SCMA is a non-orthogonal multiplexing technique realized by the super-imposing of multi-dimensional codewords selected from codebooks which may be assigned to different layers, users or UEs. Instead of mapping coded bits to QAM symbols and repeating the same QAM symbols over multiple tones, as in code division multiple access (CDMA) and low density signature (LDS), coded bits are directly mapped to multi-dimensional codewords. One major benefit of SCMA codebooks is the shaping gain of multi-dimensional constellations. In SCMA, overloading is achievable with moderate complexity of detection thanks to the sparseness of SCMA codewords. SCMA can show noticeable gain over LDS especially for larger constellation sizes where the gain of constellation shaping is potentially larger. SCMA also provides system advantages due to its spreading and overloading capabilities. Interference whitening, open-loop user multiplexing and massive connectivity are some examples showing the benefit of SCMA from a system point of view.

SUMMARY

According to one aspect of the present invention, there is provided a method of transmitting a set of bits, the method comprising: mapping a first subset of the bits to a modulated symbol; mapping a second subset of the bits to a subset of transmission resources out of a first set of transmission resources; transmitting the modulated symbol using the subset of transmission resources.

Optionally, the subsets of transmissions resources for each combination of the second subset of bits are orthogonal to each other in at least one domain.

Optionally, the method further comprises communicating an indication of one or a combination of: the first set of transmission resources; a size of the first subset; a size of the second subset; and a mapping for use in mapping the first or the second subset of bits.

Optionally, different values of the second subset of bits map to different subsets of transmission resources.

Optionally, the set of bits consists of N bits, where $N>=3$; mapping the first subset of the bits to a modulated symbol comprises mapping M bits of the N bits to a modulated symbol on a constellation having $2^M$ points, the modulated symbol conveying the M bits, where $N>M>=2$.

Optionally, the set of bits consists of N bits, where $N>=2$; mapping the first subset of the bits to a modulated symbol comprises mapping M bits of the N bits to a modulated symbol on a constellation having $2^M$ points, the modulated symbol conveying the M bits, where $N>M>=1$.

Optionally, mapping a second subset of the bits to a subset of transmission resources out of a first set of transmission resources comprises mapping K bits of the N bits to P transmission resources out of R possible transmission resources.

Optionally, the set of bits consists of N bits, where $N>=3$; wherein mapping a second subset of the bits to a subset of transmission resources out of a first set of transmission resources comprises mapping K bits of the N bits to P transmission resources out of R possible transmission resources.

Optionally, $K=N-M$.

Optionally, $K>N-M$.

Optionally, at least one input bit is common to the first subset and the second subset.

Optionally, mapping the second subset of bits to a subset of transmission resources maps the second subset to a unique selection of the subset of transmission resources.

Optionally, mapping the remaining N−M bits comprises mapping the N−M bits to a first subset of P transmission resources when the N−M bits have a first set of values, and mapping the N−M bits to a second subset of P transmission resources different than the first when the N−M bits have a second set of values different than the first.

Optionally, $N=3$, $M=2$, $K=1$, $P=1$, and $R=2$.

Optionally, mapping M bits to a modulated symbol on a constellation having $2^M$ points comprises mapping $M=2$ bits to a QPSK symbol.

Optionally, the mapping is such that no more than one bit changes between two adjacent points in the constellation.

Optionally, the set of possible transmission resources comprises one or a combination of: a plurality of time-frequency resource elements; a plurality of OFDM resource elements, each resource element being an OFDM subcarrier; a plurality of code domain resources; a plurality of code domain resources, wherein the set of possible transmission resources is determined by code domain resource length; a plurality of spatial resources; a plurality of antenna beams; a plurality of antenna ports.

Optionally, the method further comprises determining the first set of transmission resources as a subset of a second set of transmission resources based on a sparsity pattern.

Optionally, mapping the second subset of bits to a subset of transmission resources is performed to a granularity of individual transmission resources.

Optionally, mapping the second subset of bits to a subset of transmission resources is performed to a granularity of groups of transmission resources.

According to another aspect of the present invention, there is provided a method of receiving a set of bits, the method comprising: receiving a modulated symbol using a subset of transmission resources; determining a first subset of bits by demodulating the demodulated symbol; determining a second subset of bits based on the subset of transmission resources over which the modulated symbol was received;

Optionally, the method further comprises the first set of transmission resources; a size of the first subset; a size of the second subset; and a mapping for use in mapping the first or the second subset of bits.

According to another aspect of the present invention, there is provided an apparatus configured to implement one of the methods summarized above or described herein.

According to another aspect of the present invention, there is provided an apparatus for transmitting a set of bits, the apparatus comprising: a constellation mapper configured to map a first subset of the bits to a modulated symbol; a transmission resource mapper configured to map a second subset of the bits to a subset of transmission resources out of a first set of transmission resources; a transmitter configured to transmit the modulated symbol using the subset of transmission resources.

Optionally, the transmitter is further configured to communicate an indication of one or a combination of: the first set of transmission resources; a size of the first subset; a size of the second subset; and a mapping for use in mapping the first or the second subset of bits.

Optionally, different values of the second subset of bits map to different subsets of transmission resources.

Optionally, the set of bits consists of N bits, where N>=3; the constellation mapper is configured to map the first subset of the bits to a modulated symbol by mapping M bits of the N bits to a modulated symbol on a constellation having $2^M$ points, the modulated symbol conveying the M bits, where N>M>=2.

Optionally, the transmission resource mapper is configured to map a second subset of the bits to a subset of transmission resources out of a first set of transmission resources comprises mapping K bits of the N bits to P transmission resources out of R possible transmission resources.

Optionally, the set of bits consists of N bits, where N>=3; wherein the transmission resource mapper is configured to map a second subset of the bits to a subset of transmission resources out of a first set of transmission resources comprises mapping K bits of the N bits to P transmission resources out of R possible transmission resources.

Optionally, K=N−M.

Optionally, K>N−M.

Optionally, at least one input bit is common to the first subset and the second subset.

Optionally, the transmission resource mapper is configured to map the second subset to a unique selection of the subset of transmission resources.

Optionally, the transmission resource mapper is configured to map the remaining N−M bits comprises mapping the N−M bits to a first subset of P transmission resources when the N−M bits have a first set of values, and mapping the N−M bits to a second subset of P transmission resources different than the first when the N−M bits have a second set of values different than the first.

Optionally, N=3, M=2, K=1, P=1, and R=2.

Optionally, the constellation mapper is configured to map M bits to a modulated symbol on a constellation having $2^M$ points comprises mapping M=2 bits to a QPSK symbol.

Optionally, the mapping is such that no more than one bit changes between two adjacent points in the constellation.

Optionally, the set of possible transmission resources comprises one or a combination of: a plurality of time-frequency resource elements; a plurality of OFDM resource elements, each resource element being an OFDM sub-carrier; a plurality of code domain resources; a plurality of code domain resources, wherein the set of possible transmission resources is determined by code domain resource length; a plurality of spatial resources; a plurality of antenna beams; a plurality of antenna ports.

Optionally, the plurality of time-frequency resource elements comprise a plurality of OFDM resource elements, each resource element being an OFDM sub-carrier.

Optionally, the set of possible transmission resources comprises a plurality of code domain resources.

Optionally, the set of R possible transmission resources is determined by code domain resource length.

Optionally, the set of possible transmission resources comprises a plurality of spatial resources.

Optionally, the plurality of spatial resources comprises a plurality of antenna beams.

Optionally, the plurality of spatial resources comprises a plurality of antenna ports.

Optionally, the apparatus further comprises determining the first set of transmission resources as a subset of a second set of transmission resources based on a sparsity pattern.

Optionally, mapping the second subset of bits to a subset of transmission resources is performed to a granularity of individual transmission resources.

Optionally, mapping the second subset of bits to a subset of transmission resources is performed to a granularity of groups of transmission resources.

According to yet another aspect of the present invention, there is provided an apparatus for receiving a set of bits, the apparatus comprising: a receiver configured to receive a modulated symbol using a subset of transmission resources; a constellation de-mapper configured to determine a first subset of bits by demodulating the modulated symbol; and a transmission resource de-mapper configured to determine a second subset of bits based on the subset of transmission resources over which the modulated symbol was received.

Optionally, the receiver is further configured to communicate an indication of one or a combination of: the first set of transmission resources; a size of the first subset; a size of the second subset; and a mapping for use in determining the first or the second subset of bits from the modulated symbol and the subset of transmissions resources.

BRIEF DESCRIPTION OF THE DRAWINGS

Embodiments of the disclosure will now be described with reference to the attached drawings in which:

FIG. 5A is a block diagram of an example of the system of FIG. 4A in which the transmission resource mapping is an OFDM resource element mapping;

FIG. 5B depicts an example output of the OFDM resource element mapping of FIG. 5A;

FIG. 5C depicts an example output of an OFDM resource element mapping where a bit subset mapper produces overlapping first and second subsets of bits;

FIG. 8A is a block diagram of an example of the system of FIG. 4A in which the transmission resource mapping is an input bit dependent spatial domain mapping;

FIG. 8B depicts an example output of the input bit dependent spatial domain mapping of FIG. 8A;

FIG. 8C depicts an example output of the input bit dependent spatial domain mapping of FIG. 8A where antenna ports are selected;

DETAILED DESCRIPTION

Figure 1:
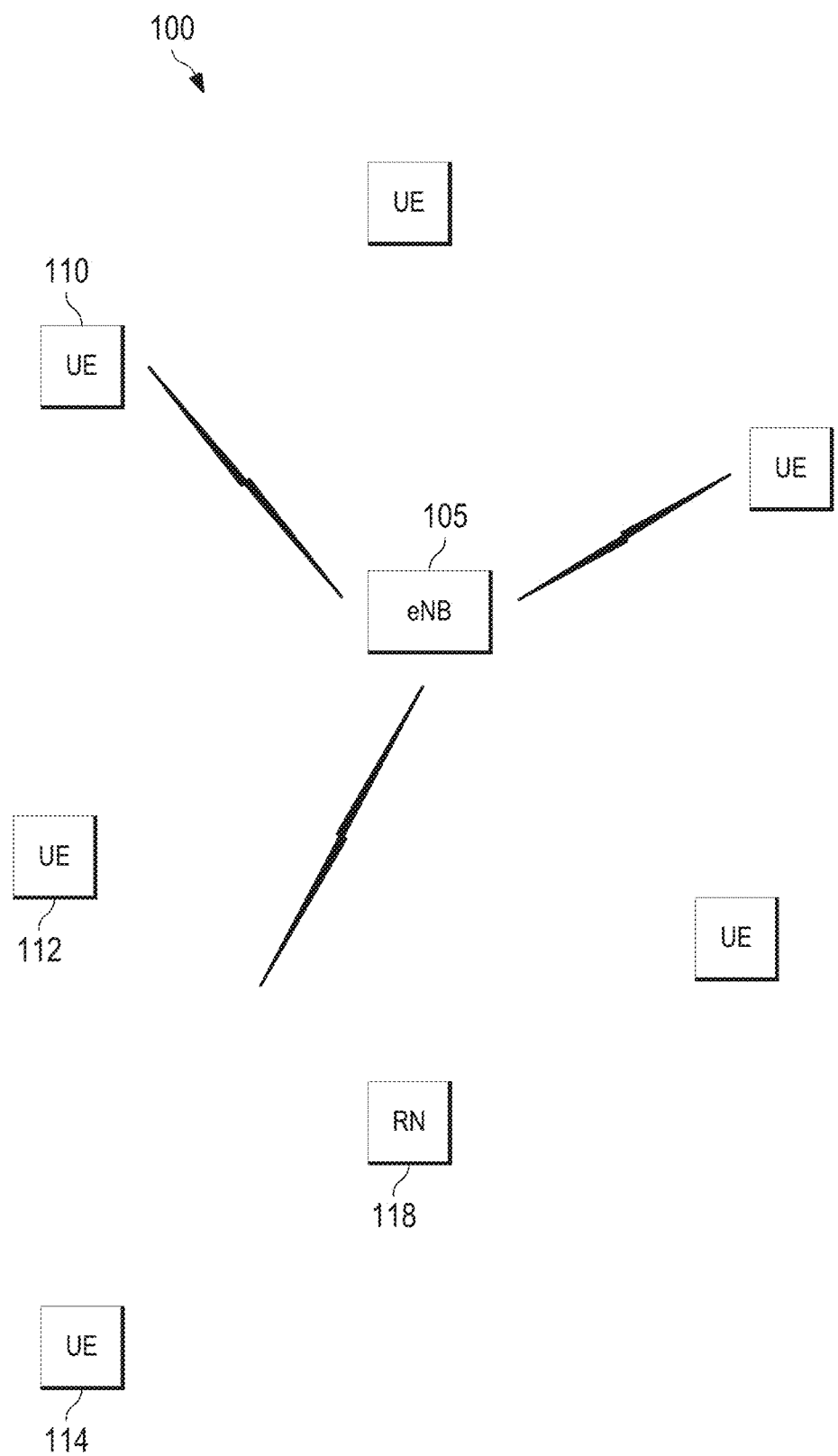
FIG. 1 illustrates an example communications system according to example embodiments described herein.

The operation of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

The present disclosure will be described with respect to example embodiments in a specific context. The disclosure may be applied to standards compliant communications systems, such as those that are compliant with Third Generation Partnership Project (3GPP), IEEE 802.11, and the like, technical standards, as well as non-standards compliant communications systems. Generally, the principles described herein may be applied to any system or network that is configured to allow multiple devices, users, or user equipments (UEs) to share a transmission resource pool e.g. using non-orthogonal or multiple access communications.

In sparse code multiple access (SCMA), data (e.g. coded bits) is spread over multiple time-frequency tones resources of orthogonal frequency division multiple access (OFDMA) resources (or any other types of orthogonal resources or multi-carrier modulation) through codewords. In SCMA, multiple access is provided through the use of different codebooks for different multiplexed layers (or UEs), as opposed to the use of different spreading sequences for different multiplexed layers, e.g., a LDS signature in LDS, as is common in conventional CDMA encoding. The codewords are sometimes viewed as multi-dimensional because they each consists of a sequence of symbols mapped to different tones or sub-carriers. With SCMA, the value of the input bits determines the specific codeword generated. In other words, different sets of input bit values generate (or map to) different codewords or different symbol sequences where the relationship between the symbols in a symbol sequence is input bit dependent (i.e. non-linear spreading).

The set of possible codewords (for all possible combinations of input bit values) define a codebook that may be used for a particular data stream of a particular layer, user or UE. Different codebooks may be assigned to different layers, users or UEs to enable transmission of multiple data streams and/or provide multiple access. Note that a user or UE may be assigned more than one codebook to transmit multiple different bit streams or in general, M-ary data streams, where M is an integer number greater than or equal to 2.

Some SCMA approaches directly encode the data stream into multidimensional codewords and circumvents quadrature amplitude modulation (QAM) symbol mapping. Such SCMA encoding techniques convey a data stream using multidimensional codewords rather than QAM symbols spread over multiple tones. In SCMA, codewords may additionally be sparse if the symbols, which may be from the same or different (multi-dimensional) constellations, are mapped only to a subset of the available resources (e.g. tones). When used, sparsity enables receivers to use low complexity algorithms, such as message passing algorithms (MPA), to detect respective codewords from combined codewords received by the receiver, thereby reducing processing complexity in the receivers.

FIG. 1 illustrates an example communications system 100. Communications system 100 may support SCMA or other non-orthogonal or multiple access communications. Communications system 100 may include an evolved NodeB (eNB) 105 operating as a communications controller. Communications system 100 may also include user equipment (UE), such as UE 110, UE 112, and UE 114. eNB 105 may include multiple transmit antennas and multiple receive antennas to facilitate multiple input multiple output (MIMO) operation, wherein a single eNB (or transmit node) may simultaneously transmit multiple data streams to multiple users, a single user also with multiple receive antennas, or a combination thereof. Similarly, the UEs may include multiple transmit antennas and multiple receive antennas to support MIMO operation. In general, an eNB may also be referred to as a communications controller, a NodeB, a base station (BS), a controller, and the like. Similarly, a UE may also be referred to as a mobile station, a mobile, a terminal, a user, a subscriber, and the like. Communications system 100 may also include a relay node (RN) 118 that is capable of utilizing a portion of resources of eNB 105 to help improve coverage and/or overall performance of communications system 100.

While it is understood that communications systems may employ multiple eNBs capable of communicating with (e.g. transmitting to and/or receiving from) a number of UEs, only one eNB, one RN, and a number of UEs are illustrated for simplicity.

SCMA is just an example of one multiple access scheme that can be used by UEs 110, 112, 114 and/or eNB 105 for uplink communications (e.g. from UEs 110, 112, 114 to eNB 105) or for downlink communications (e.g. from eNB 105 to UEs 110, 112, 114). As noted above, SCMA is a code-domain multiplexing scheme over multicarrier modulation in which the codebooks may be sparse and hence detection can be made simpler. Other multiple access schemes may be used, and transmissions may be multiplexed in a domain different than a code domain (e.g. power, time, frequency, space, etc.). Various system parameters such as a modulation order, spreading factor, sparsity, a (maximum) number of allowed multiplexed layers and/or assigned spreading/sparsity sequences or codebook(s) may be used in the eNB 105 or in UEs 110, 112, 114 (e.g. as signaled by the eNB 105), to activate or enable multiple access transmissions (e.g. uplink or downlink) in system 100.

Figure 2:
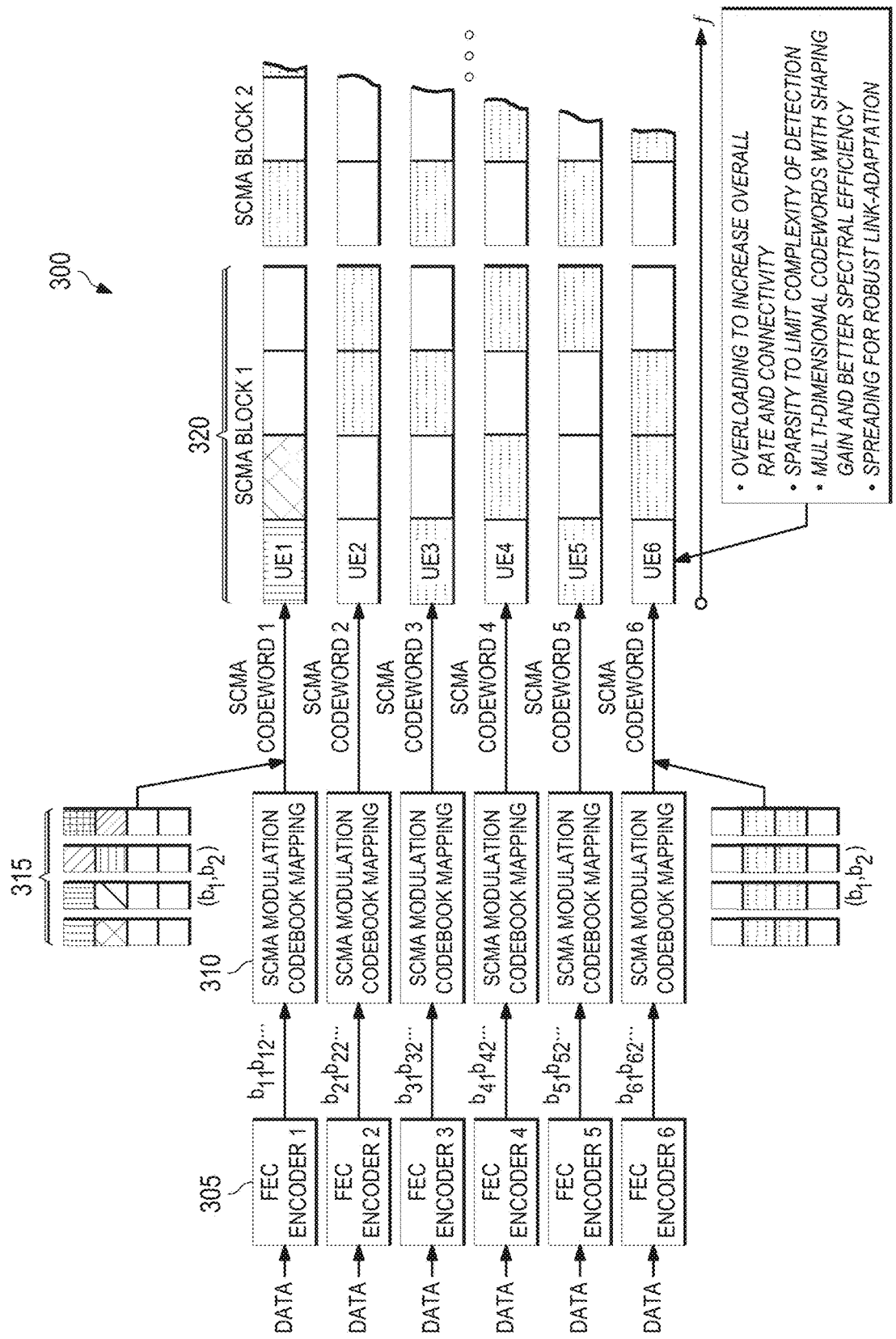
FIG. 2 illustrates an example SCMA multiplexing and an example process of data being modulated with example SCMA codebooks to fill SCMA blocks according to example embodiments described herein.

FIG. 2 illustrates a diagram 300 of an example SCMA multiplexing and an example process of data being modulated with example SCMA codebooks to fill SCMA blocks of tones or sub-carriers. Data to be transmitted (e.g. from different layers, users or UEs) are provided to forward error correcting code (FEC) encoders, such as FEC encoder 305, to produce encoded data for different users. Examples of FEC encoders include polar encoders, turbo code encoders but other types of FEC encoders may be used. The data is provided to SCMA modulation codebook mapping units, such as SCMA modulation codebook mapping unit 310, to produce SCMA codewords, such as SCMA codewords 315. First SCMA codewords are inserted into SCMA block 320. It is noted that as shown in FIG. 2, every layer has an FEC or payload. As noted above, one or more layers may be assigned to a single user or UE.

Figure 3:
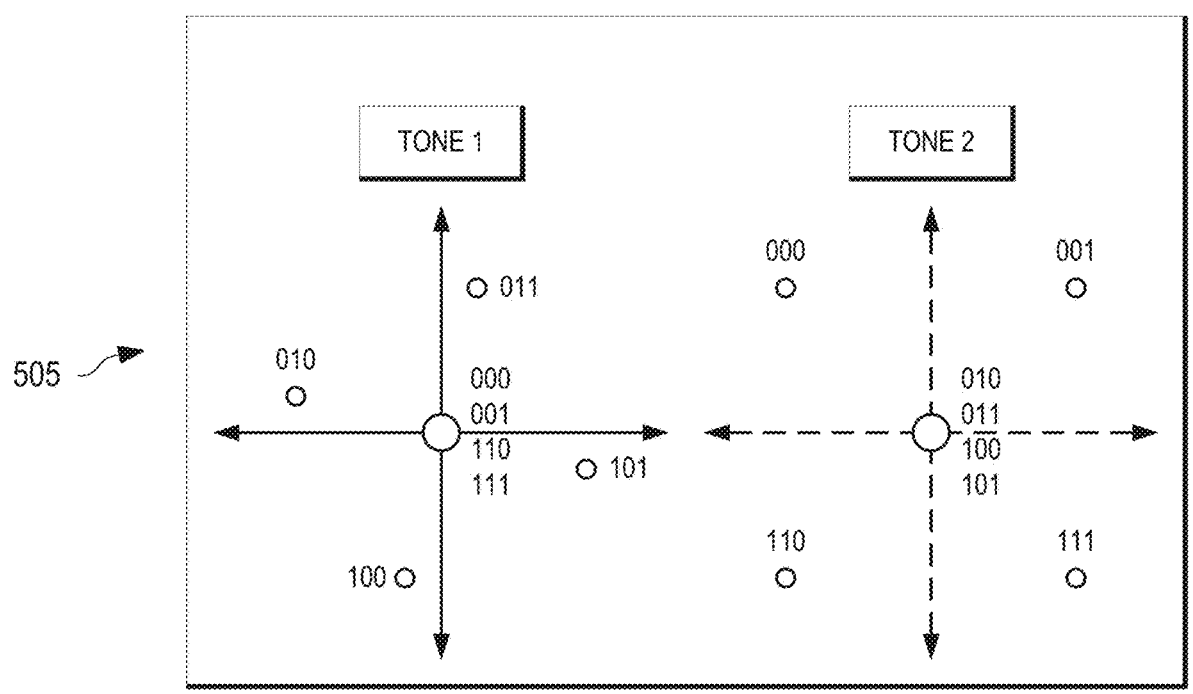
FIG. 3 illustrates an example low PAPR (peak-to-average power ratio) two-dimensional constellation.

FIG. 3 illustrates an example 8-point two-dimensional constellation 505. The 8-point two-dimensional constellation 505 includes two dimensions where each dimension corresponding to a particular tone or sub-carrier in this example). FIG. 5b illustrates an example 8-point two-dimensional constellation 520, 522. 8-point low PAPR two-dimensional constellation 520, 522 includes two dimensions. In both of these examples, the constellations 505, 520, 522 may be said to provide a low Power to Average Power Ratio (PAPR) and may be referred to as low PAPR constellations.

It can be seen that the constellation of FIG. 3 is not a conventional QPSK mapping on the two complex dimensions (tones in the illustrated example). It can be seen that adjacent symbols in the constellation differ by more than one bit. For example, the symbol in the northeast quadrant of the constellation for tone 2 differs by two bits compare d to the symbol in the southeast quadrant of the same constellation. As such, the constellation of FIG. 3 cannot be employed using a conventional QPSK mapper as a building block.

Figure 4A:
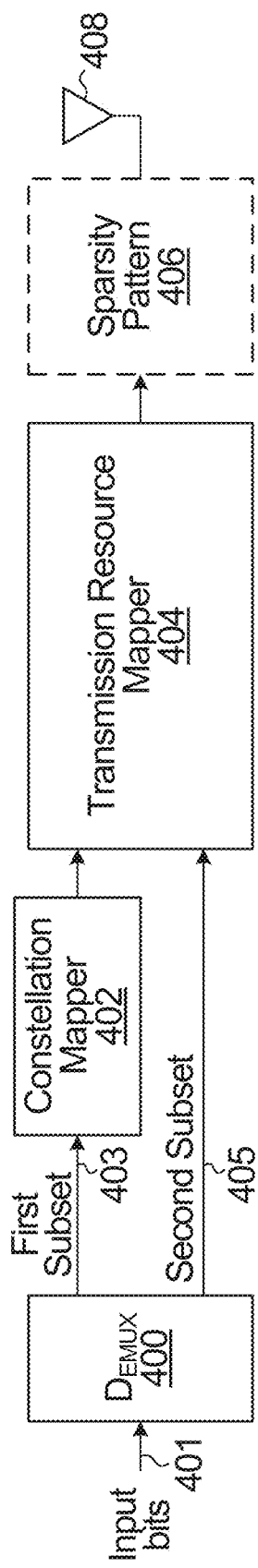
FIG. 4A is a block diagram of a system for conveying information through transmission resource mapping in accordance with an embodiment of the invention, where distinct subsets of bits map to modulation symbols and transmission resources.

Referring now to FIG. 4A, shown is a block diagram of a system for conveying information through transmission resource mapping in accordance with an embodiment of the invention, where non-overlapping subsets of input bits map to modulation symbols and transmission resources. The system may be implemented in different devices such as the eNB 105 and/or UEs 110, 112, 114. Shown is a splitter or demultiplexer 400 having an input 401 and two outputs 403,405. The first output 403 is connected to a constellation mapper 402 which in turn is connected to a transmission resource mapper 404. The second output 405 is also connected to the transmission resource mapper 404. The output of the transmission resource mapper 404 is connected to one or more transmit antennas 408, optionally after sparsity pattern mapper 406.

In operation, a set of input bits received at input 401 is split by demultiplexer 400 into two subsets of bits on outputs 403,405. Alternatively, subsets of the input bits can be received directly at the constellation mapper 402 and the transmission resource mapper 404 without the need for the demultiplexer 400. The constellation mapper 402 maps the first subset of the bits to a modulated symbol. The constellation mapper 402 may be implemented in many different ways and depending on how the constellation mapper 402 is implemented, the type of modulated symbol produced can vary. In a specific example, the constellation mapper 402 is a QPSK modulator and the modulated symbol is a QPSK symbol. In another example, the constellation mapper 402 is a BPSK modulator and the modulated symbol is a BPSK (or π/2 BPSK) symbol. Various other examples are provided below. In the transmission resource mapper 404, the second subset of bits is mapped to a subset of transmission resources out of a first set of transmission resources. Various examples are provided below. In some embodiments, the transmission resource mapper 404 may implement a direct mapping of the second subset of bits to transmission resources. For example, if the second subset contains one bit, the value of that bit can directly map to two possible transmission resources. In other embodiments, the transmission resource(s) are allocated or determined by the transmission resource mapper 404 based on a function of the second subset. In a specific example, the subset of transmission resources is one or more OFDM sub-carriers within a set of OFDM sub-carriers. The modulated symbol is then transmitted to another device (e.g. the eNB 105 and/or UEs 110, 112, 114) using the subset of transmission resources.

Although not shown, a system to recover the bits from modulated symbols which have been transmitted using the above transmitting apparatus may be implemented in a corresponding receiving apparatus. This receiving apparatus or system which may be implemented in different devices such as the eNB 105 and/or UEs 110, 112, 114, may, for example include a receiver configured to receive a modulated symbol using a subset of transmission resources, a constellation de-mapper (or demodulator) configured to determine a first subset of bits by demodulating the modulated symbol, and a transmission resource de-mapper configured to determine a second subset of bits based on the subset of transmission resources over which the modulated symbol was received. Various other implementations are possible. For example, receiving systems corresponding to the examples of transmitting systems provided below can also be used. In another example, each component of the receiving system implements or is configured to perform the reverse function described in connection with the transmitting system (e.g. receiving v. transmitting, demodulating v. modulating, de-mapper v. mapper, multiplexer v. demultiplexer, etc.) to recover the first and second subsets of input bits.

Generation of a sparse symbol sequence means generating a set of symbols where at least one of the symbols (or elements in the sequence) represents a zero value. The zero value symbol is indicated by a state of the transmission resource(s). In some implementations, a character '0' may be used to indicate a zero value. A zero constellation point (i.e., a constellation symbol with zero power) may for example represent the zero value. Examples of transmission resources may include physical or logical transmission resources such as frequency, time, antenna ports, antenna elements, sub-carriers, REs, beams, frequency bands, etc. A sparsity factor may be defined as a ratio of non-zero resources (or elements) utilized for data transmission for a given device over the total available resources.

In some implementations, a sparse symbol sequence can be generated by puncturing. At first, a non-sparse symbol sequence of length K is generated and L ($>=1$) elements, where L$>=$N, are punctured based on a desired sparsity pattern to produce a desired sparse symbol sequence of length L.

Alternatively, sparsity can be produced by padding one or more zero symbols to a sequence of symbols and performing symbol level interleaving or scrambling, or both.

In embodiments where the sparsity pattern mapper 406 is present, the first set of transmission resources is associated with resources defined by a sparsity pattern, and the subset of transmission resources is a subset of those resources. Note that alternatively, sparsity can be incorporated directly in the transmission resource mapper. In this case, the second subset of bits selects or is otherwise used to allocate transmission resources within the available transmission resources as defined by the sparsity pattern.

In some embodiments, the constellation mapper 402 implements a mapping such that no more than one bit changes between two adjacent points in the constellation, for example a Gray mapping. In other embodiments, the mapping can be non-Gray, or anti-Gray.

In some embodiments, the set of input bits consists of N bits, where N>=3. In some embodiments, mapping the first subset of the bits to a modulated symbol comprises mapping M bits of the N bits to a modulated symbol on a constellation having $2^M$ points, the modulated symbol conveying the M bits, where N>M>=2. In some embodiments, mapping the second subset of the bits to a subset of transmission resources out of a first set of transmission resources comprises mapping a remaining K=N−M bits of the N bits to P transmission resources out of R possible transmission resources. In some embodiments, N>=2, and N>M>=1, to encompass BPSK (or π/2 BPSK) as well.

In implementations where QPSK modulation is used for example, QPSK symbols can convey 2 bits (e.g. M=2) out of 3 input bits (N=3), and a remaining bit (K=N−M=1) of the 3 input bits map to 1 (P=1) transmission resource out of 2 (R=2) possible transmission resources. However, other possibilities exist for N, M, and K. In some embodiments, the set of input bits is N>=2 and BPSK modulation is used. In that example, BPSK (or π/2 BPSK) symbols can convey 1 bit (e.g. M=1) out of the 2 input bits (N=2), and a remaining bit (K=N−M=1) of the 2 input bits map to 1 (P=1) transmission resource out of 2 (R=2) possible transmission resources. In other embodiments, higher order modulation such as 16 QAM or 256 QAM and/or a higher number of transmission resources P may be used to convey more bits. More generally, different modulation schemes and/or different transmission resource mappings can accommodate different numbers of input bits (N), or different numbers of bits in the first subset (M) or in the second subset (K). Also, the number of P of transmission resources and R possible transmission resources may vary depending on the number of bits in the second subset to be conveyed via the transmission resource mapping.

Optionally, mapping the second subset of bits to a subset of transmission resources maps the second subset to a unique subset of transmission resources, in the sense that any two different second subsets will map to different selections of the subset of transmission resources. For this purpose, two subsets of transmission resources are considered different, or unique, when they are not entirely coterminous. For example, wherein mapping the remaining N−M bits comprises mapping the N−M bits to a first subset of P transmission resources when the N−M bits have a first set of values, and mapping the N−M bits to a second subset of P transmission resources different than the first when the N−M bits have a second set of values different than the first.

Figure 4B:
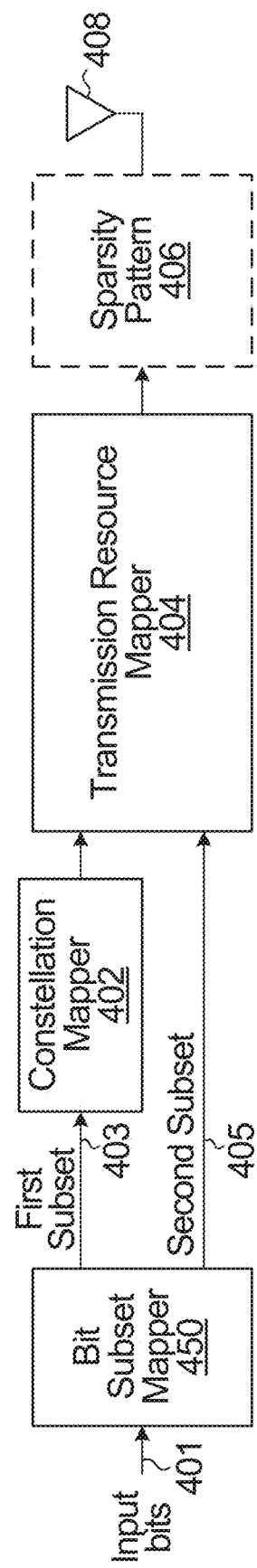
FIG. 4B is a block diagram of a system for conveying information through transmission resource mapping in accordance with an embodiment of the invention, where overlapping subsets of bits map to modulation symbols and transmission resources.

Referring now to FIG. 4B, shown is a block diagram of a system for conveying information through transmission resource mapping in accordance with an embodiment of the invention, where overlapping subsets of bits map to modulation symbols and transmission resources. The embodiment of FIG. 4B is the same as that of FIG. 4A, except that in place of demultiplexer there is a bit subset mapper 450. In some embodiments, bit subset mapper 450 is configurable to produce the first and second subset of bits, such that all of the bits are represented in one or both of the two subsets. In some embodiments, there is no overlap between the bits of the two subsets in which case the functionality of FIG. 4B is equivalent to that of FIG. 4A. In other embodiments, there is some overlap between the bits of the two subsets, meaning at least one bit is included in both subsets. An example is provided below. As before the first subset is mapped to a modulated symbol, and the second subset selects or determines the transmission resource(s) selected or allocated for transmitting the symbol. In some embodiments, the transmission resource is selected as a function of the second subset of bits. In an example detailed below, the transmission resource is selected based on an XOR or XNOR operation applied to a second subset of bits (e.g. which could contain two bits). Using the terminology used above, K=the number of bits mapped to the transmission resources is greater than N−M.

For both the embodiments of FIGS. 4A and 4B, the second subset of bits indicates the subset of transmission resources which has been selected or allocated. In specific examples detailed below (FIGS. 5A,5B,5C), the transmission resources are OFDM subcarriers or a group of subcarriers. More generally, the bits used for resource selection can select between individual resources (e.g. tones, beams, etc.), or between groups of resources. As in the embodiment of FIG. 4A, transmission resource mapper of FIG. 4B can perform a direct mapping of the second subset of input bits to transmission resources, or can determine the transmission resources by applying a function to the second subset of input bits.

Where the transmission resources are subcarriers and sparsity is employed, the sparsity pattern can be subcarrier based or subcarrier group based, and correspondingly, the transmission resource allocation granularity can be a subcarrier or a subcarrier group.

In some embodiments, the transmission resource allocation granularity is subcarrier group, and/or a spreading sequence is applied to the subcarrier group to distinguish the transmissions of multiple UEs, and/or to distinguish multiple streams of one UE. In this case, the second subset of bits selects a subcarrier group (for example, from a set of possible subcarrier groups). The subcarrier group might for example contain 4 subcarriers. Then, multiple data streams can be transmitted using the same resources using different spreading sequences. Referring now to 4C, shown is a flowchart of a method for conveying information through transmission resource mapping in accordance with an embodiment of the invention. Optionally, the method begins with demultiplexing a set of bits to produce first subset and a second subsets of the bits at 450. When this step is performed, the first and second subsets are non-overlapping. Another optional step which is performing a bit subset mapping to produce first and second subsets of bits at 452. When this step is performed, the first and second subsets may be overlapping or non-overlapping. Optionally, at 454, a first set of transmission resources as a subset of a second set of transmission resources based on a sparsity pattern, but more generally, the first set of transmission resources can be any set of transmission resources. Many examples of transmission resources are detailed below. The method continues at 456 with mapping a first subset of the bits to a modulated symbol. At 458, a second subset of the bits is mapped to a subset of transmission resources out of a first set of transmission resources. At 460, the modulated symbol is transmitted using the subset of transmission resources.

Referring now to FIG. 5A, shown is a block diagram of an example of the system of FIG. 4A in which the transmission resource mapper 404 of FIG. 4A is an input bit dependent OFDM resource element mapper 504. In this case, the subset of transmission resources is a set of at least one OFDM sub-carrier within a first set of OFDM sub-carriers. More generally, any time-frequency resource elements can be used as the transmission resources. When sparsity is present, the first set of OFDM sub-carriers is determined by a sparsity pattern within a second set of OFDM sub-carriers.

Referring now to FIG. 5B, shown is an example output of the input bit dependent OFDM resource element mapper of FIG. 5A, or the transmission resource mapper 404 of FIG. 4A or 4B. For this example, there are N=3 input bits. M=2 bits are mapped to a modulated symbol e.g. a QPSK symbol), and the remaining K=N−M=1 bit is used to select P=1 transmission resource out of R=2 transmission resources, which are OFDM sub-carriers or tones. The bit mapping of the first tone for any set of 3 input bits is indicated at 520, and the bit mapping of the second tone for any set of 3 input bits is indicated at 522. It can be seen that for any combination of bits, only one of the mappings is non-zero. For example, for input bits="110", the northwest constellation point in mapping 520 is selected, and the origin (i.e. 0) is selected in mapping 522. This is equivalent to selecting the first transmission resource. With the mapping depicted, the first bit (in this example, the most significant bit) selects the transmission resource, and the second and third bits (in this example, the least significant bits) are a QPSK mapping (e.g. mapped to a QPSK symbol). It can be seen that a "Gray mapping" is used to map the input bits. In other words, for any pair of adjacent symbols on either of the two sub-carriers, only one bit changes.

Referring now to FIG. 5C, shown is an example output for either the input bit dependent OFDM resource element mapper 504 or the transmission resource mapper 404. For this example, N=3, and the three input bits are $b_i$, $b_{i+1}$, $b_{i+2}$, $b_i$ and $b_{i+2}$ denote the most and the least significant bits of the three bits, respectively. M=2 bits (bits $b_{i+1}$ and $b_{i+2}$) are passed to constellation mapper 402 which performs QPSK mapping with Gray labelling.

The bit mapping of the first tone for any set of 3 input bits is indicated at 550, and the bit mapping of the second tone for any set of 3 input bits is indicated at 552. For this example, the selection of OFDM resource (e.g. OFDM subcarrier) relies on a second subset of K=2 input bits $b_i$ and $b_{i+1}$ that overlaps with the first subset of input bits, in the sense that $b_{i+1}$ is included in both the first subset and the second subset. While the example assumes OFDM resources, the same approach can be used for any transmission resources.

In the example of FIG. 5C, the selection of the OFDM resource is based on a function applied to the second subset of input bits, namely an XNOR of $b_i$ and $b_{i+1}$. If $b_i$ XNOR $b_{i+1}$ is 1, the sub-carrier for mapping 550 is active (i.e. selected), otherwise the right sub-carrier for mapping 552 is active. Equivalently, if $b_i$ XOR $b_{i+1}$ is 1, the sub-carrier for mapping 552 is active, and otherwise the sub-carrier for mapping 550 is active. $b_i$ and $b_{i+1}$ which select which sub-carrier is active and which is inactive are underlined in FIG. 5C for clarity. XOR/XNOR are the functions that determines the selection of the transmission resources. It can be seen that with the example of FIG. 5C, even though a Gray mapping was used to map the first subset of bits, the overall bit mapping is not a Gray mapping, since adjacent symbols differ by more than one bit. For example, for the mapping 552 in FIG. 5C, the northeast symbol is mapped to 100 which differs in two bit positions compared to adjacent northwest symbol mapped to 010.

In another example, N=5, M=4, P=1, and R=2. In a specific example, M=4 bits are mapped to a 16 QAM constellation (e.g. using a 16 QAM modulator as constellation mapper 402), and N−M=1 bit is used to select one of two transmission resources, for example one of two OFDM sub-carriers.

Figure 4C:
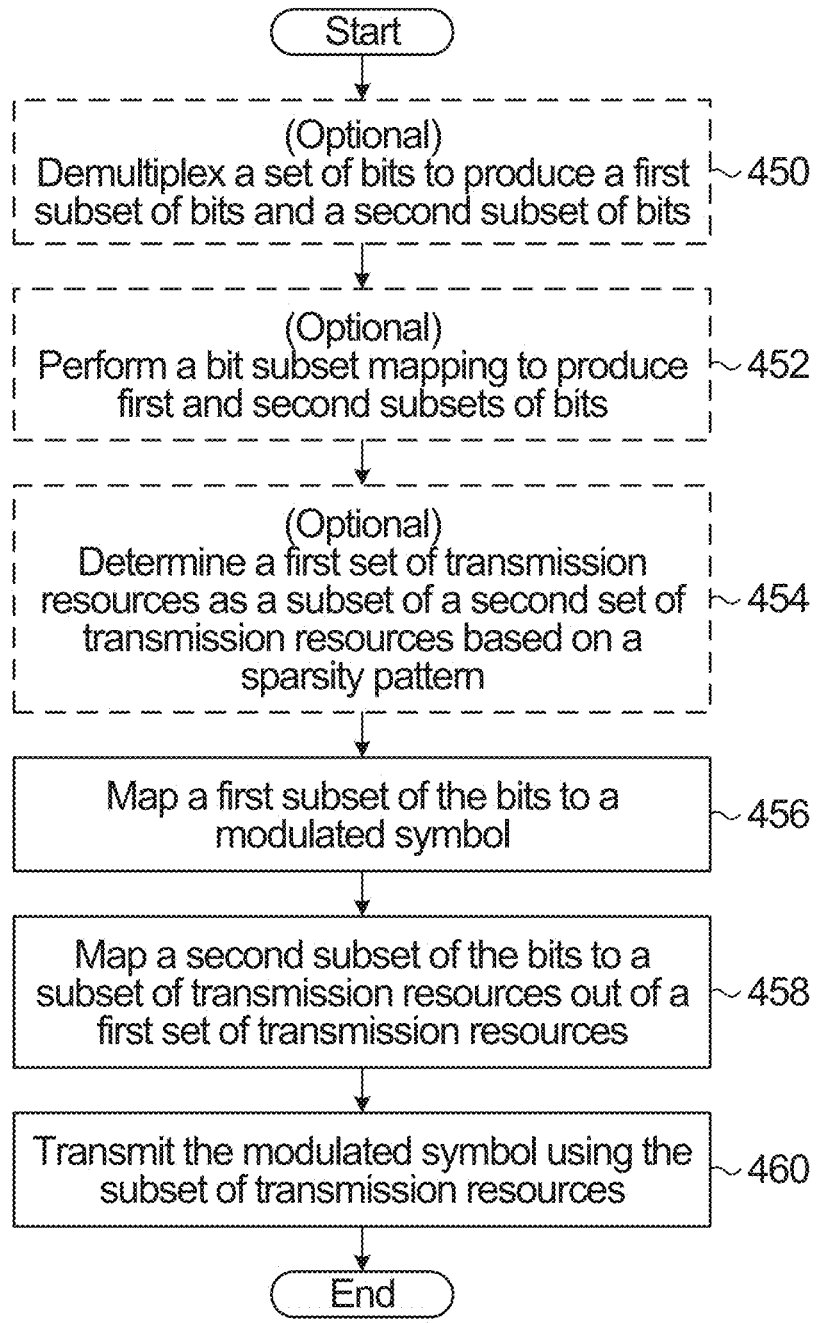
FIG. 4C is a flowchart of a method for conveying information through transmission resource mapping in accordance with an embodiment of the invention.
Figure 6A:
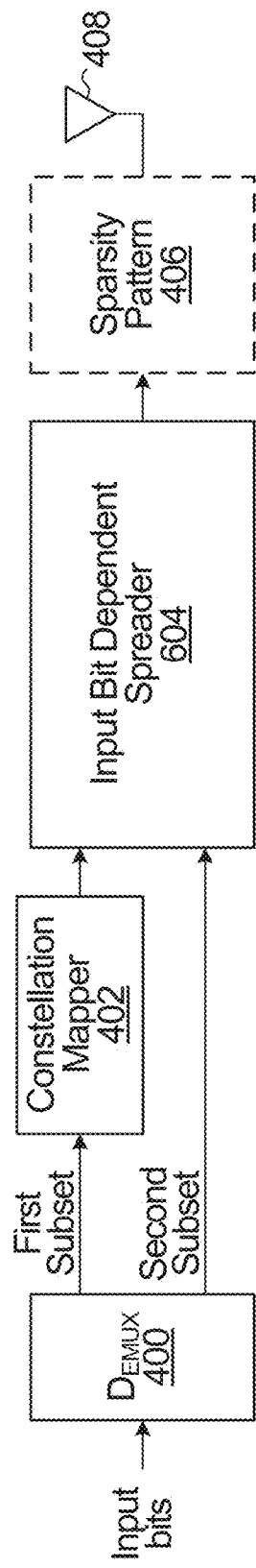
FIG. 6A is a block diagram of an example of the system of FIG. 4A in which the transmission resource mapping is performed by an input bit dependent spreader.

Referring now to FIG. 6A, shown is a block diagram of an example of the system of FIG. 4 in which the transmission resource mapper 404 of FIG. 4 is an input bit dependent spreader 604. In this case, the subset of transmission resources is a spreading sequence within a set of possible spreading sequences. More generally, embodiments can use code domain resource elements, such as spreading sequences or vectors, signatures, code words to name a few specific examples. In some embodiments, the set of R possible transmission resources is determined by a spreading code domain length, e.g. spreading sequence length or code word length.

Figure 6B:
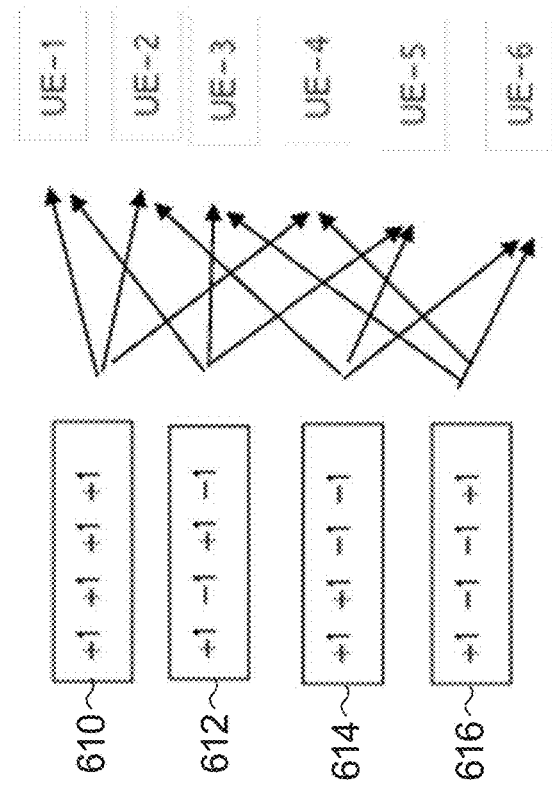
FIG. 6B depicts an example output of the input bit dependent spreader of FIG. 6A.

An example is shown in FIG. 6B which shows four spreading sequences 610,612,614,616. Each UE uses two of the spreading sequences, and the selection of the spreading sequence determines one information bit. For example, UE-1 uses spreading sequences 610 and 612. In a specific example, a QPSK constellation point (determined by two input bits such as the least significant 2 bits of a set of 3 information bits) is spread by one of the two sequences dependent on a third input bit (e.g. the most signification bit).

In a specific example, one bit is used to select a sequence that spreads the QPSK symbol. In a specific example, there are two sequences S1 and S2. If the bit is 0, S1 is used to spread the QPSK symbol and if it is one, S2 is used. In a specific example, this can be used to select which OFDM sub-carriers to use, where each element of the sequence has an associated sub-carrier. Tone-switching between the first two possible tones out of an overall set of four tones is like using the spreading sequences of S1=[1 0 0 0] and S2=[0 1 0 0]. Other possibilities exist for spreading symbols with different spreading sequences based on a subset of input bits.

In some embodiments, a given UE has multiple assigned signatures (e.g. in the form of assigned matrices or vectors) for spreading that are used in different ways:

1—Use multi-layer transmission and use a different signature for each layer of data;

2—Break down the coded bits into multiple streams and spread each one with a signature (e.g. using a spreading matrix);

3—Break down the coded bits into subsets of index bits and data bits and use index bits to select the spreading signature to be used for each stream of data bits.

In some embodiments, sparsity patterns are used as transmission resources. More specifically, optionally, the set of possible transmission resources comprises a plurality of sparsity patterns. In a specific example, the plurality of sparsity patterns includes the set of two patterns, {[1 1 0 0], [ 0 0 1 1]} and one bit can be used to select which sparsity pattern is used. In this case, in the block diagrams shown in FIGS. 4A and 4B, the sparsity pattern 406 would be incorporated into the transmission resource mapper 404.

In some embodiments, the subsets of transmissions resources for each combination of the second subset of bits are orthogonal for example, in at least one domain: (time, frequency, code, space, etc.) to make sure that the decoding performance is not compromised. The reason is that if the transmission resources associated with different values of the bits in the second subset have some overlap, then there may be ambiguity on the value of the actual transmitted bit(s) in the overlap area.

The following is a specific example of transmission resources incorporating spreading sequences: Assuming transmission resources that comprise two spreading sequences S1 and S2, the condition for orthogonality in at least one domain (time/frequency, code, space, etc.) is satisfied if the two spreading sequences are orthogonal in the complex or code domain, i.e. $S_1^H \cdot S_2=0$, where (·) means element-wise complex multiplication. The set of four spreading sequences shown in FIG. 6B, i.e. [1 1 1 1], [1 −1 1 −1], [1 1 −1 −1], [1 −1 −1 1] also satisfy this orthogonality condition. Other orthogonality conditions or domains can also be used.

In some embodiments, there may be multiple possibilities for the set of transmission resources, and/or for the mapping between subsets of transmissions resources to bits. In some embodiments, an indication of the set of transmission resources, from which a subset is used to convey the second subset of the bits, is communicated (e.g. transmitted and/or received) between the network and UE (more generally between a transmitter and a receiver), and/or the mapping between different subsets of transmission resources to bits is communicated. This can be one or a combination of:

a. Indication transmitted from the network to the UE in respect of transmissions from the network to the UE, for use by the UE in receiving the transmissions;
b. Indication transmitted from the network to the UE for transmissions from the UE to the network, for use by the UE in making the transmissions;
c. Indication transmitted from the UE to the network in respect of transmissions from the network to the UE, for use by the network in making the transmissions;
d. Indication transmitted from the UE to the network for transmissions from the UE to the network, for use by the network in receiving the transmissions.

The indication can include for example one or a combination of:

a. An indication of which resources to use for each combination of the second subset of bits;
b. An indication of the set of transmission resources, from which the mapping from each combination of bits to respective subsets can be derived, for example, using a rule known to both the transmitter and the receiver;
c. An indication of a particular set of transmission resources as among multiple possible such sets. In some embodiments, a sparsity pattern is used to select resources from a larger pool of possible transmission resources to form the particular set of transmission resources. The sparsity pattern, or an indication of the sparsity pattern can be signaled to the UE in this case.

In some embodiments, explicit signaling is used to convey how many bits are transmitted through the mapping to transmission resources. In other embodiments, this is derived implicitly from signaling that identifies the set of transmission resources. For example, if signaling identifies a set of 8 possible transmission resources, this can be used to implicitly conclude 3 bits are transmitted through the mapping to transmission resources.

In some embodiments, signaling is transmitted that indicates the breakdown between number of bits (e.g. N−M=K) conveyed through the transmission resource mapping, and the number of bits (e.g. M) conveyed through modulation. In some embodiments, the total number of bits N per transmission is the sum of these two amounts. The signaling can, for example, convey one of:

N and M;
N and K;
K and M;
an index associated with values for N, K and M.

In some embodiments, the UE makes the selection of the set of transmission resources out of a plurality of such sets. The UE may indicate or report the selection to the network explicitly, for example as detailed above, or alternatively, it can be implicit, for example, by making the selection linked to UE identifier using a pre-configured mapping. Other explicit or implicit possibilities exist for signaling the selection to the network.

In some embodiments, the network indications (explicit or implicit) described above which are provided to the UE can be conveyed semi-statically using radio resource control (RRC), higher layer signaling or based on dynamic signaling (e.g. downlink Control Information (DCI) signaling) or MAC CE (control element) or any combination thereof. Other possibilities exist for the network indications. In other embodiments, the UE indications (explicit or implicit) described above which are provided to the network can be conveyed using pilot signals or other reference signals. Other possibilities exist for the UE indications as well.

Figure 7A:
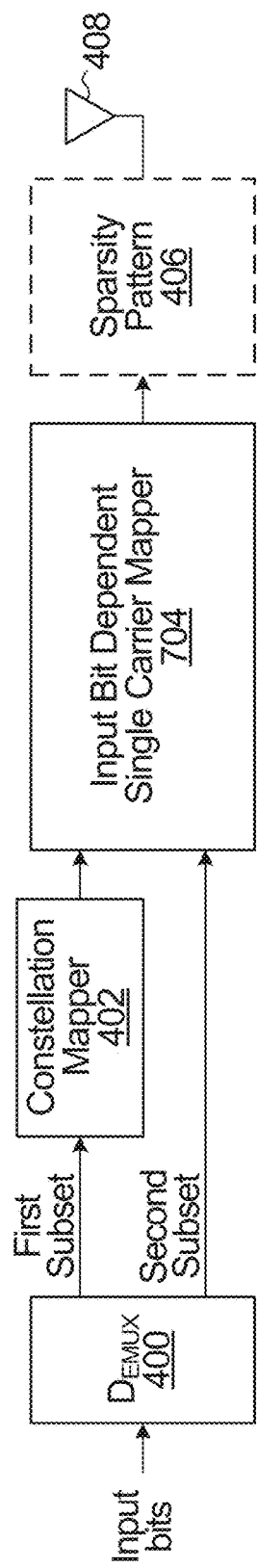
FIG. 7A is a block diagram of an example of the system of FIG. 4A in which the transmission resource mapping is an input bit dependent single carrier mapping.

Referring now to FIG. 7A, shown is a block diagram of an example of the system of FIG. 4 in which the transmission resource mapper 404 of FIG. 4 is an input bit dependent single carrier mapper 704. With this embodiment, a non-OFDM based waveform is used, in which there is a set of possible carriers within a bandwidth. In some embodiments, the bandwidth of the carriers can be adjusted. A narrow bandwidth single carrier waveform may be appropriate for use in coverage limited cases due to power concentration in a narrow bandwidth. In this embodiment, the second subset of bits is used to select the carrier within the set of possible carriers. When sparsity is present, the set of possible carriers is the set remaining after application of the sparsity pattern.

Figure 7B:
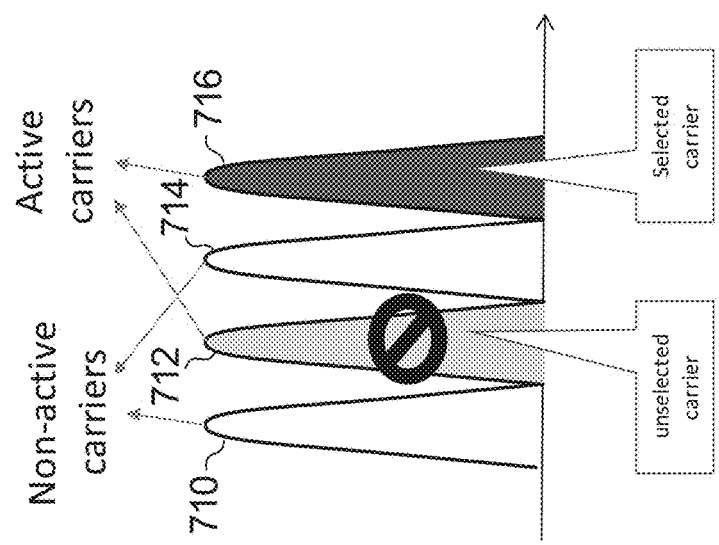
FIG. 7B depicts an example output of the input bit dependent single carrier mapping of FIG. 7A.

Referring now to FIG. 7B, shown is an example output of the input bit dependent single carrier mapper of FIG. 7A. In this example, there are four carriers 710,712,714,716. Two carriers 712,716 are "active" meaning they are selected by the sparsity pattern, and two 710,714 are non-active. One or the other of the active two carriers 712,716 is selected dependent on an input bit. At the instant depicted, the fourth carrier 716 is selected, and the second carrier 712 is not selected. The modulated symbol is transmitted using the fourth carrier.

Referring now to FIG. 8A, shown is a block diagram of an example of the system of FIG. 4 in which the transmission resource mapper 404 of FIG. 4 is an input bit dependent spatial domain mapper 804, meaning that different spatial resources are selected dependent on the second subset of input bits. Examples below include antenna beams and antenna ports, but more generally, any spatial domain resource elements can be used as the transmission resources.

In a first example, the input bit dependent spatial domain mapper 804 selects antenna beams from within sets of antenna beams. Referring now to FIG. 8B shown an example output of the input bit dependent spatial domain mapper of FIG. 8A where antenna beams are selected. In this example, there are four beams 810,812,814,816. Two beams 812,816 are "active" meaning they are selected by the sparsity pattern, and two 810,814 are non-active. One or the other of the active two beams 812,816 is selected dependent on an input bit. At the instant depicted, the fourth beam 816 is selected, and the second beam 812 is not selected. The modulated symbol is transmitted using the fourth beam.

In a second example, the input bit dependent spatial domain mapper 804 selects antenna ports from within sets of antenna ports. Referring now to FIG. 8C shown another example output of an input bit dependent spatial domain mapper where antenna ports are selected. In this example, there are four antenna ports having associated beams 910, 912,914,916. Two antenna ports having beams 912,916 are "active" meaning they are selected by the sparsity pattern, and two antenna ports having beams 910,914 are non-active. One or the other of the active two antenna ports having beams 912,916 is selected dependent on an input bit. At the instant depicted, the fourth antenna port having beam 916 is selected, and the second antenna port having beam 912 is not selected. The modulated symbol is transmitted using the fourth antenna port.

While the embodiments of FIGS. 5A, 6A,7A and 8A all show the use of a demultiplexer 400 to separate the input bits into non-overlapping sets of input bits for constellation mapping and transmission resource mapping, alternatively, in any of these embodiments, a bit subset mapper may be used to produce overlapping subsets of bits for constellation mapping and transmission resource mapping.

As can be seen from the above embodiments, additional bits may be transmitted through transmission resource mapping beyond those conveyed by symbol modulation. In some embodiments, this may be advantageous where it is desirable to use a conventional modulator (e.g. QPSK, 16 QAM) but have the ability to transmit additional bits (e.g. 3 or more bits instead of 2 for QPSK, 5 or more bits instead of 4 for 16 QAM). Also, despite the fact that a conventional modulator (e.g. QPSK or 16 QAM) may be used in these or other embodiments, the bit mapping techniques described herein can provide a form of non-linear spreading, where the relationship between the spread or modulated symbols in a symbol sequence is input bit dependent i.e. it uniquely identifies a particular combination of input bit values. In some implementations of non-linear spreading, different subsets of the input bits (which may or may not overlap) are associated with different subsets of symbols in the sequence (which also may or may not overlap), and the relationship between the symbols in any given subset depends on the value of the input bits in the associated subset of input bits. Non-linear spreading may be helpful to mitigate or reduce interference between transmissions (from different UEs/users/layers).

Figure 9:
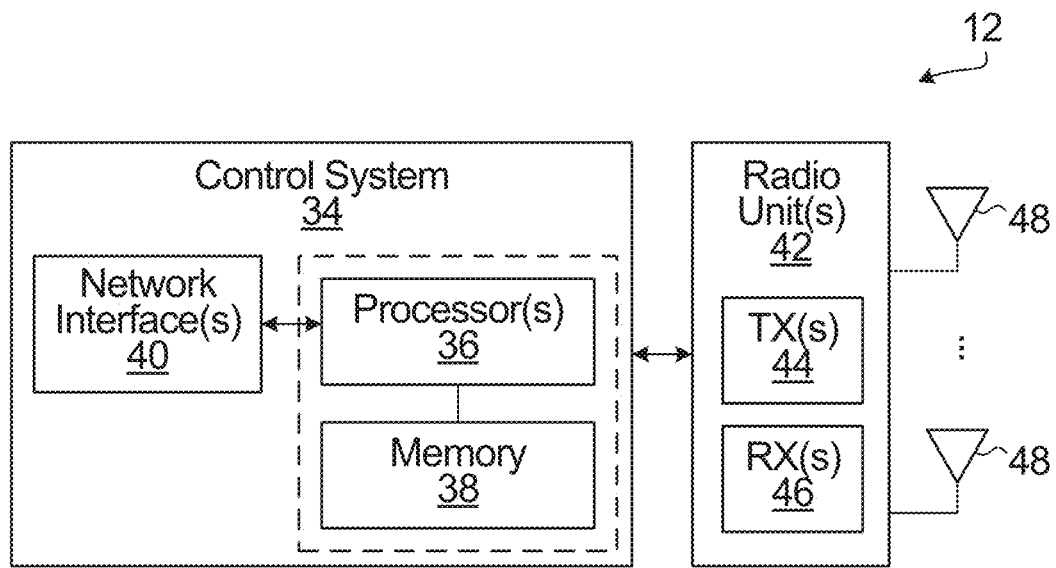
FIG. 9 is a block diagram of a base station within which embodiments of the invention may be implemented.

FIG. 9 is a schematic block diagram of a BS 12 (e.g. the eNB 105) according to some embodiments of the present disclosure. As illustrated, the BS 12 includes a control system 34 configured to perform the functions and/or the embodiments described herein (e.g. as shown in FIGS. 4A to 8C). In some implementations, the control system 34 is in the form of circuitry configured to perform the functions and/or the embodiments described herein. In yet other implementations, the control system or circuitry 34 includes one or more processors 36 (e.g., CPUs, ASICs, FPGAs, and/or the like) and memory 38 and optionally a network interface 40. The BS 12 also includes one or more radio units 42 that each includes one or more transmitters 44 and one or more receivers 46 coupled to one or more antennas 48. In some implementations, the BS 12 does not include radio units 42 but is configured to interface with a separate transmission module. For example, some of all of the functionality and/or embodiments described herein may be implemented in hardware or circuitry such as processors 36 and memory 38 (e.g. in one or more chipsets, microprocessors, application-specific integrated circuits (ASIC), field-programmable gate arrays (FPGAs), dedicated logic circuitry, or combinations thereof) so as to produce symbols as described herein for transmission by a separate (RF) unit. In some other implementations, the functionality of the BS 12 described herein may be fully or partially implemented in software or modules that is, e.g., stored in the memory 38 and executed by the processor(s) 36.

In yet other implementations, a computer program including instructions which, when executed by at least one processor, causes the at least one processor to carry out the functionality of the BS 12 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

Figure 10:
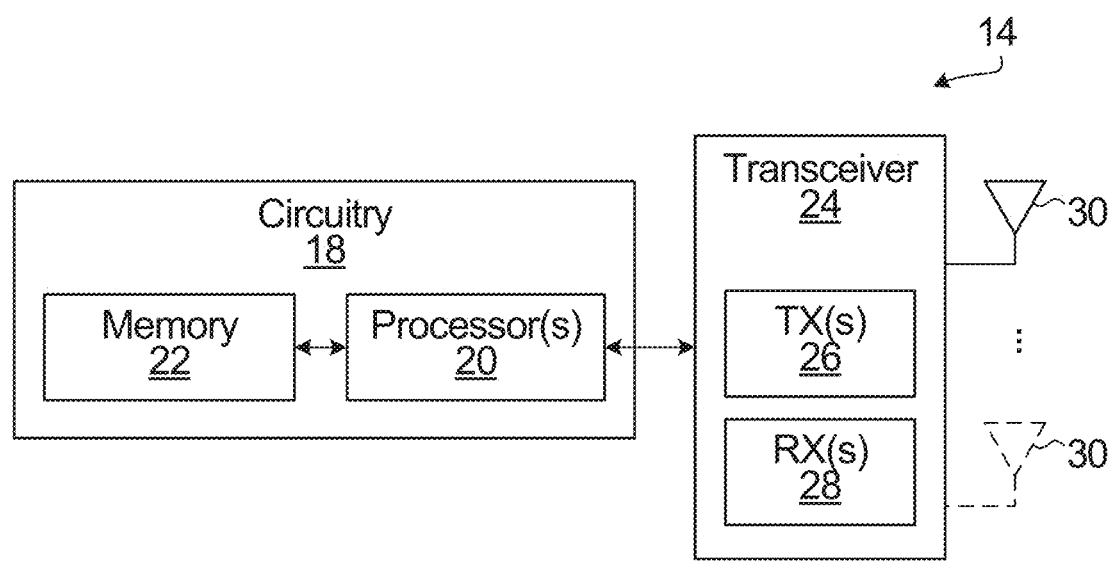
FIG. 10 is a block diagram of a wireless device within which embodiments of the invention may be implemented.

FIG. 10 is a schematic block diagram of a wireless device 14 (e.g. UE 110, 112, 114) according to some embodiments of the present disclosure. Wireless device 14 is also referred to as a UE herein. As illustrated, the wireless device 14 includes circuitry 18 configured to perform the functions and/or embodiments described herein (e.g. as shown in FIGS. 4A to 8A). In some implementations, the circuitry 18 includes one or more processors 20 (e.g., Central Processing Units (CPUs), Application Specific Integrated Circuits (ASICs), Field Programmable Gate Arrays (FPGAs), and/or the like) and memory 22. The wireless device 14 also includes one or more transceivers 24 each including one or more transmitter 26 and one or more receivers 28 coupled to one or more antennas 30. In some implementations, the wireless device 14 does not include transceivers 24 but is configured to interface with a separate transmission module. For example, some of all of the functionality and/or embodiments described herein may be implemented in hardware or circuitry such as circuitry 18 (e.g. in one or more chipsets, microprocessors, application-specific integrated circuits (ASIC), field-programmable gate arrays (FPGAs), dedicated logic circuitry, or combinations thereof) so as to produce symbols as described herein for transmission by a separate (RF) unit. In some other implementations, the functionality of the wireless device 14 described herein may be fully or partially implemented in software or modules that is, e.g., stored in the memory 22 and executed by the processor(s) 20.

In yet other implementations, a computer program including instructions which, when executed by at least one processor, causes the at least one processor to carry out the functionality of the wireless device 14 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

Although the present disclosure and its advantages have been described in detail, it should be understood that various changes, substitutions and alterations can be made herein without departing from the spirit and scope of the disclosure as defined by the appended claims.

Numerous modifications and variations of the present disclosure are possible in light of the above teachings. It is therefore to be understood that within the scope of the appended claims, the disclosure may be practiced otherwise than as specifically described herein.

The invention claimed is:

1. A method of transmitting a set of bits, the method comprising:

mapping a first subset of the bits to a modulated symbol;

mapping a second subset of the bits to a subset of transmission resources out of a first set of transmission resources, such that the subset of transmission resources is selected based on the values of the second subset of bits;

transmitting the modulated symbol using the subset of transmission resources;

wherein the set of bits consists of N bits, where N>2;

wherein mapping the first subset of the bits to a modulated symbol comprises mapping 2 bits of the N bits to a QPSK symbol;

wherein different values of the second subset of bits map to different subsets of transmission resources;

wherein mapping a second subset of the bits to a subset of transmission resources out of a first set of transmission resources comprises mapping K bits of the N bits to P transmission resources out of R possible transmission resources; and wherein N=3, M=2, K=1, P=1, and R=2.

2. The method of claim 1 further comprising:

communicating an indication of one or a combination of:
the first set of transmission resources;
a size of the first subset;
a size of the second subset; and
a mapping for use in mapping the first or the second subset of bits.

3. The method of claim 1 wherein mapping the second subset of bits to a subset of transmission resources maps the second subset to a unique selection of the subset of transmission resources.

4. The method of claim 3 wherein mapping the remaining N-M bits comprises mapping the N-M bits to a first subset of P transmission resources when the N-M bits have a first set of values, and mapping the N-M bits to a second subset of P transmission resources different than the first when the N-M bits have a second set of values different than the first.

5. The method of claim 1 wherein the set of possible transmission resources comprises one or a combination of:
a plurality of time-frequency resource elements;
a plurality of OFDM resource elements, each resource element being an OFDM sub-carrier;
a plurality of code domain resources;
a plurality of code domain resources, wherein the set of possible transmission resources is determined by code domain resource length;
a plurality of spatial resources;
a plurality of antenna beams;
a plurality of antenna ports.

6. The method of claim 1 further comprising:
determining the first set of transmission resources as a subset of a second set of transmission resources based on a sparsity pattern.

7. An apparatus for transmitting a set of bits, the apparatus comprising:
a constellation mapper configured to map a first subset of the bits to a modulated symbol;
a transmission resource mapper configured to map a second subset of the bits to a subset of transmission resources out of a first set of transmission resources, such that the subset of transmission resources is selected based on the values of the second subset of bits;
a transmitter configured to transmit the modulated symbol using the subset of transmission resources;

wherein the set of bits consists of N bits, where N>2;

the constellation mapper maps the first subset of the bits to a modulated symbol by mapping 2 bits of the N bits to a QPSK symbol;

wherein the transmission resource mapper is configured to map a second subset of the bits to a subset of transmission resources out of a first set of transmission resources comprises mapping K bits of the N bits to P transmission resources out of R possible transmission resources; and wherein N=3, M=2, K=1, P=1, and R=2.

8. The apparatus of claim 7 wherein the transmitter is further configured to communicate an indication of one or a combination of:
the first set of transmission resources;
a size of the first subset;
a size of the second subset; and
a mapping for use in mapping the first or the second subset of bits.

9. The apparatus of claim 7 wherein different values of the second subset of bits map to different subsets of transmission resources.

10. The apparatus of claim 7 wherein the transmission resource mapper is configured to map the second subset to a unique selection of the subset of transmission resources.

11. The apparatus of claim 10 wherein the transmission resource mapper is configured to map the remaining N-M bits comprises mapping the N-M bits to a first subset of P transmission resources when the N-M bits have a first set of values, and mapping the N-M bits to a second subset of P transmission resources different than the first when the N-M bits have a second set of values different than the first.

12. The apparatus of claim 7 wherein the set of possible transmission resources comprises one or a combination of:
a plurality of time-frequency resource elements;
a plurality of OFDM resource elements, each resource element being an OFDM sub-carrier;
a plurality of code domain resources;
a plurality of code domain resources, wherein the set of possible transmission resources is determined by code domain resource length;
a plurality of spatial resources;
a plurality of antenna beams;
a plurality of antenna ports.

13. The apparatus of claim 7 further comprising:
determining the first set of transmission resources as a subset of a second set of transmission resources based on a sparsity pattern.

* * * * *